(12) United States Patent
Tümpner

(10) Patent No.: US 8,139,105 B2
(45) Date of Patent: Mar. 20, 2012

(54) METHOD AND DEVICE FOR OPTICALLY SCANNING A SAMPLE

(75) Inventor: Jürgen Tümpner, Münster (DE)

(73) Assignee: Olympus Soft Imaging Solutions GmbH, Münster (DE)

( * ) Notice: Subject to any disclaimer, the term of this patent is extended or adjusted under 35 U.S.C. 154(b) by 1457 days.

(21) Appl. No.: 11/597,010

(22) PCT Filed: Apr. 8, 2005

(86) PCT No.: PCT/EP2005/003714
§ 371 (c)(1),
(2), (4) Date: Jan. 24, 2007

(87) PCT Pub. No.: WO2005/114093
PCT Pub. Date: Dec. 1, 2005

(65) Prior Publication Data
US 2007/0258114 A1    Nov. 8, 2007

(30) Foreign Application Priority Data
May 17, 2004    (DE) .......................... 10 2004 024 810

(51) Int. Cl.
*G01B 7/34* (2006.01)
*G02B 21/24* (2006.01)

(52) U.S. Cl. .......... 348/79; 358/474; 358/504; 359/362; 359/391; 359/819; 359/820; 359/398; 382/128; 382/255; 382/100; 382/168; 382/173

(58) Field of Classification Search .................... 348/79
See application file for complete search history.

(56) References Cited

U.S. PATENT DOCUMENTS

| 4,673,988 | A | 6/1987 | Jansson et al. |
|---|---|---|---|
| 4,760,385 | A | 7/1988 | Jansson et al. |
| 5,323,003 | A | 6/1994 | Shido et al. |
| 5,825,670 | A | 10/1998 | Chernoff et al. |
| 6,864,975 | B2 * | 3/2005 | Itoh et al. ...................... 356/317 |
| 2001/0030286 | A1 | 10/2001 | Egawa et al. |
| 2003/0117618 | A1 * | 6/2003 | Itoh et al. ...................... 356/317 |
| 2006/0048091 | A1 * | 3/2006 | Joshi et al. ...................... 716/21 |
| 2006/0126170 | A1 * | 6/2006 | Yamashita et al. ............ 359/398 |

OTHER PUBLICATIONS

International Search Report.

* cited by examiner

*Primary Examiner* — Jude Jean Gilles
(74) *Attorney, Agent, or Firm* — Collard & Roe, P.C.

(57) ABSTRACT

The invention relates to a method and a device for optically scanning a sample. The basic structure of the device comprises at least one adjustment unit and at least one scanning device. The sample is displaced in relation to the scanning device by means of the adjustment unit impinged upon by a control system, or vice versa. According to the invention, adjustment values for the mechanical compensation of play are incorporated, filed in the control system and taken into consideration during adjustment.

10 Claims, 3 Drawing Sheets

Figure 1:
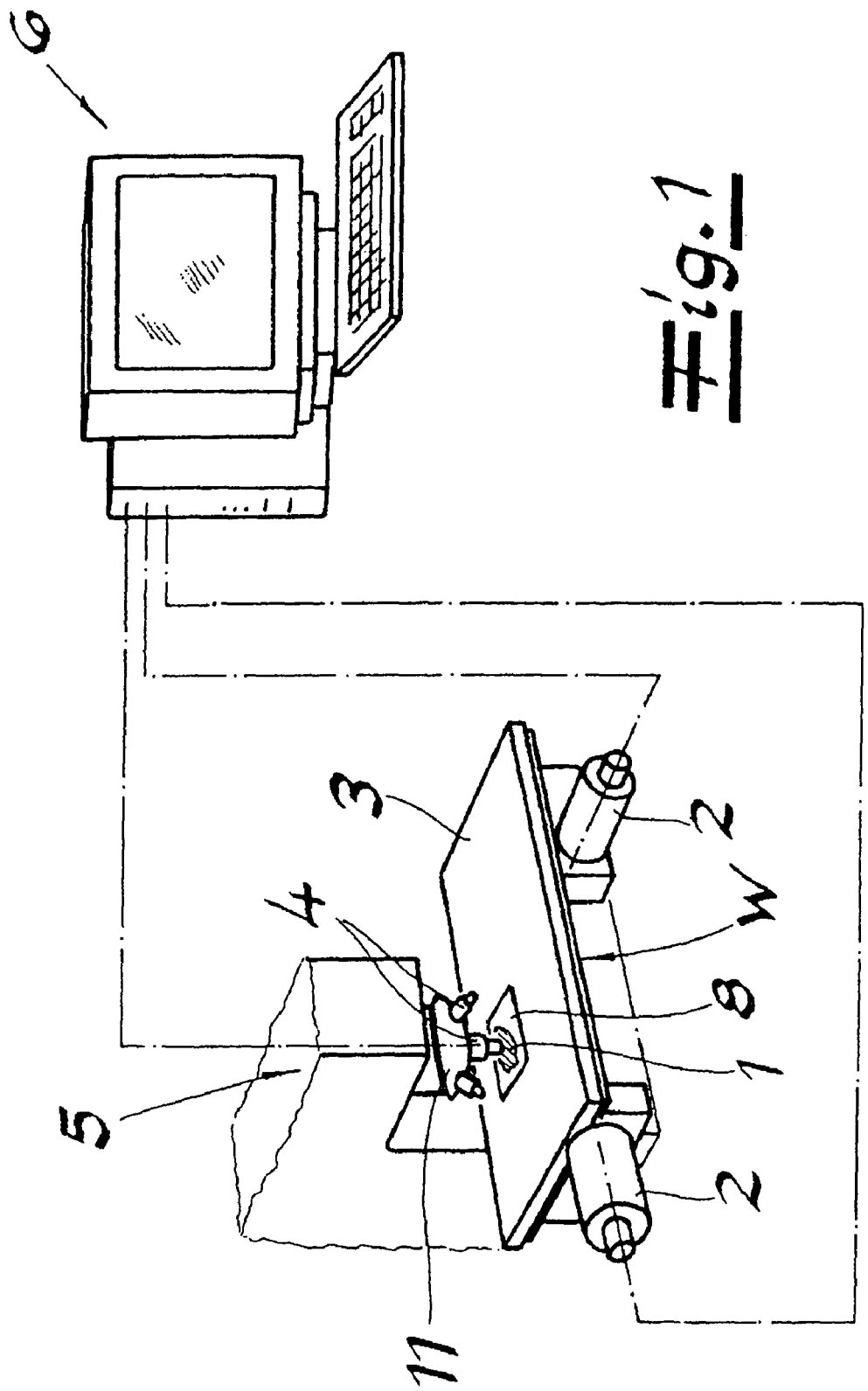

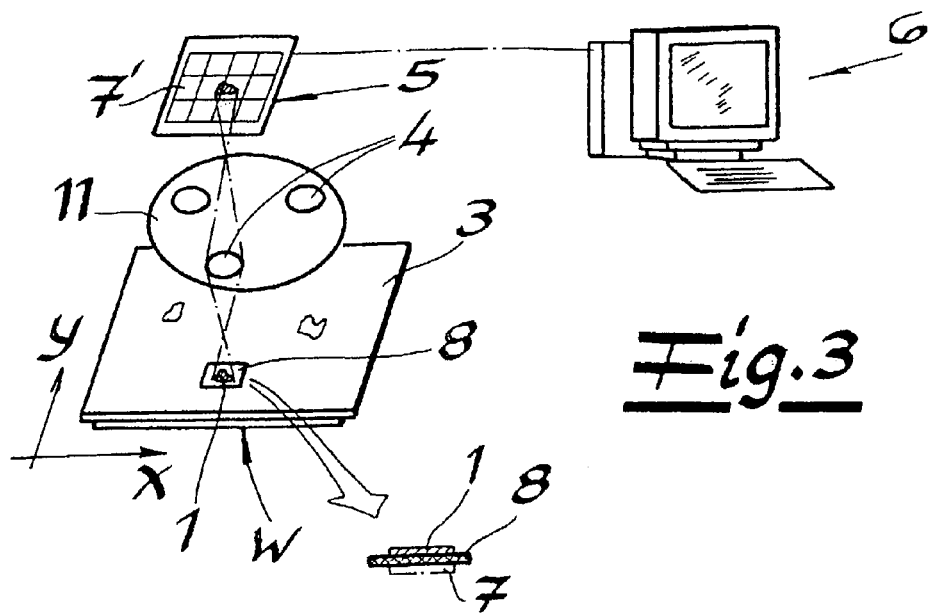
*Fig.3*
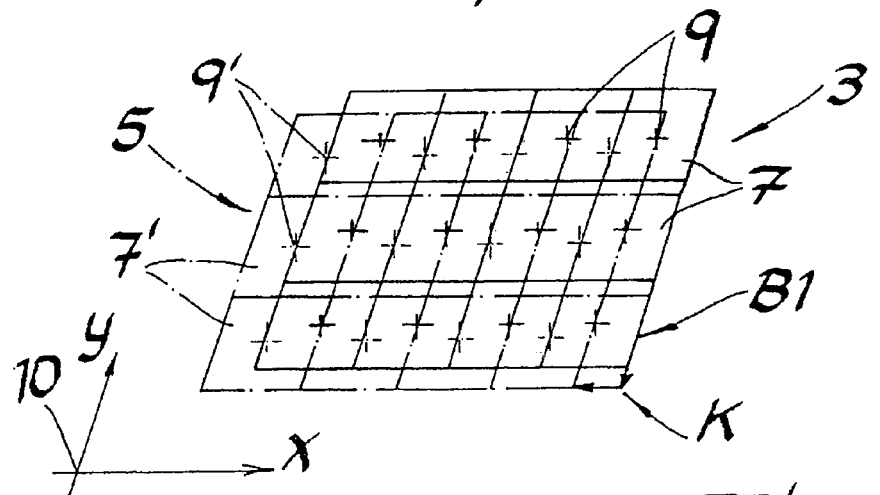
*Fig.4*
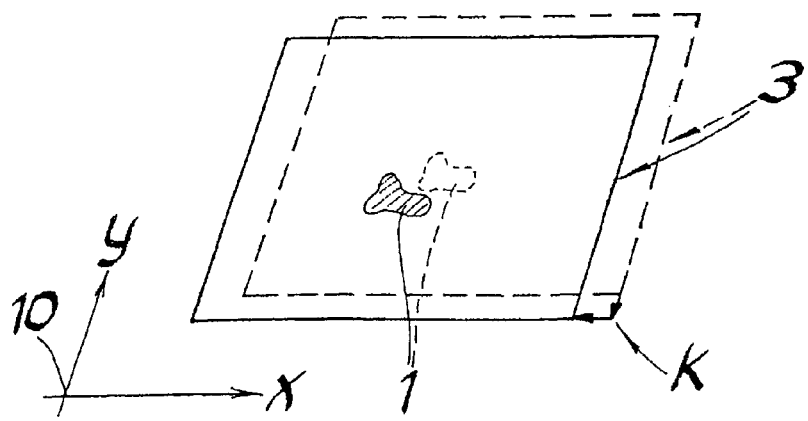

METHOD AND DEVICE FOR OPTICALLY SCANNING A SAMPLE

CROSS REFERENCE TO RELATED APPLICATIONS

Applicant claims priority under 35 U.S.C. §119 of German Application No. 10 2004 024 810.9 filed May 17, 2004. Applicant also claims priority under 35 U.S.C. §365 of PCT/EP2005/003714 filed Apr. 8, 2005. The international application under PCT article 21(2) was not published in English.

The present invention relates to a device as well as a related method for optically scanning a sample, having at least one adjustment unit having a drive device as well as a sample table, and having at least one scanning device, whereby a white-light source is disposed underneath the sample table and transilluminates the sample, so that the image of the sample is recorded by the scanning device disposed above it, whereby furthermore the sample is moved relative to the scanning device, by means of the adjustment unit activated by a control system, or vice versa, and whereby individual images of the sample are taken, using the scanning device, and subsequent to this, combined to form a total image, in the control system. Instead of moving the sample relative to the scanning device, by means of the adjustment unit including control system, the scanning device with the adjustment unit can consequently experience a movement relative to the sample, just as well (by means of the control system).

A device of the type described initially as well as a related method are known and are furthermore described within the scope of U.S. Pat. No. 4,760,385 or also U.S. Pat. No. 4,673,988. If the individual images of the sample are taken using the scanning device, and subsequently they are combined into a total image in the control system, they can be joined into the total image with overlap or abutting one another. The total image therefore represents a raster of the individual images, i.e. is composed of such a raster.

In the case of the previous methods of procedure, there is the problem that mechanical inaccuracies in the adjustment unit and/or the scanning device make the procedure of combining the individual images more difficult. Here, the usual remedy in practice has been that the sample was approached, when taking the individual images, for example, only from one direction by the adjustment unit. This is time-consuming, particularly if one considers that the total image can be composed of several tens if not hundreds of individual images. This is where the invention takes its start.

It is true that it is fundamentally known, in the case of so-called tunnel microscopes or force microscopes, to correct mechanical insufficiencies if necessary. However, the methods of procedure described in the introduction have not been decisively influenced by this (cf. US 2001/0030286 as well as U.S. Pat. No. 5,825,670).

The invention is based on the technical problem of indicating a device as well as a method for optically scanning a sample, using which device and/or method rapid scanning of the sample is possible, taking into consideration the greatest possible accuracy.

In order to solve this technical problem, a device of the stated type, for optically scanning a sample, within the scope of the invention, is characterized in that correction values are recorded and stored in the memory of the control system, and taken into consideration during the setting procedure, for a mechanical equalization of play of the adjustment unit and/or the scanning device.

The correction values therefore always come into play, for example, if a certain position of the sample is supposed to be approached using the adjustment unit, in order to take an individual image. This is because a previously determined correction value corresponds to this desired position of the sample, which value is now taken into consideration, according to the invention, during the setting procedure in question and the setting path that results from it. In this connection, the adjustment unit (including the control system that controls it)—as already indicated initially—can either activate the sample, or the scanning device, or both. In other words, fundamentally even two adjustment units are possible, for the sample, on the one hand, and for the scanning device, on the other hand, both of which are activated by a common control system or by separate control systems, in each instance. As a rule, however, the optical scanning device will be left stationary, while the sample is moved using the adjustment unit.

For this purpose, the sample is generally accommodated by a sample table, which experiences a movement in one direction (for example in the X direction), in two directions (i.e. in the X and the Y direction), or even a spatial movement (in the X, the Y, and the Z direction), using the adjustment unit. In any case, the adjustment unit with a related drive device ensures that the sample is moved relative to the scanning device, which is generally fixed in place, so that the desired individual images can be taken successively. As described, the individual images are combined into the desired total image of the sample, in the control system directly, and/or also after data transfer to a remote location, in a (different) control system, if applicable. In this connection, each individual image has a predetermined raster position in the total image.

In order to now balance out mechanical inaccuracies during this procedure, correction values are recorded either in the plant, before actual start-up of the device, or also before or during each individual measurement procedure, and stored in the memory of the related control system. These correction values take errors into consideration, for example, that can result from the fact that the drive device assigned to the adjustment unit usually has one or more spindle drives or spindle drive mechanisms that have unavoidable play. Such a spindle drive always possesses this play, which cannot be prevented, which is furthermore dependent on the position of a nut moved on the spindle and thereby of the sample table connected with it.

Furthermore, speed-dependent mechanical errors occur, which are different depending on how quickly the sample table, and with it the nut on the related spindle, is being moved. Aside from the mechanical play that is inherent to the spindle drive in the drive device that is generally used, other mechanical inaccuracies also have to be taken into consideration.

Thus, for example, in the case of two spindle drive mechanisms disposed at right angles to one another, for the implementation of an X and a Y adjustment of the sample table, it cannot be precluded that deviations from the right angle setting (orthogonality errors) exist or are present. These angle errors, just like the inaccuracies described above, contribute to the fact that problems can occur when combining the individual images to produce the total image.

In addition to these orthogonality errors, rotation errors must supplementally be taken into consideration, which can occur because the work is carried out, within the framework of the scanning device, with different microscope lenses, for example, which are accommodated in a related lens nosepiece. When adjusting this lens nosepiece, i.e. when changing from one lens to another, the position of the individual image that is being taken might change relative to a sensor or surface sensor in the scanning device, under some circumstances, and this is something that must also be corrected.

Finally, other influence variables, such as the weight of the sample table (in the case of interchangeable sample tables as well as different sample weights), the temperature at the set-up location, etc., might have an influence on the "position" of the individual image in the raster of the total image. The invention eliminates all of these errors. In other words, in the case of a device according to the invention for optically scanning a sample, the method of procedure is such that the aforementioned correction values are recorded and stored in the memory of the control device, and taken into consideration during the setting procedure, in order to balance out mechanical insufficiencies.

This is because in order to be able to record and determine the correction values described, first of all at least one reference sample in the form of a mask is scanned, where it is advantageous if this is a so-called lithography mask having defined markings. Such lithography masks are used in the production of semiconductor elements, and serve to produce the desired structures in the silicon wafer. For this purpose, such a lithography mask is irradiated with short-wave light, and has the result, on the silicon wafer covered in this manner, that only those regions of the silicon wafer, which is coated with a photo varnish, that are released by the mask undergo exposure. Sub-micron structures can be produced in semiconductor technology, using such lithography masks.

When using such lithography masks within the scope of the invention, position accuracies of approximately 1 μm can therefore be expected. In any case, the mask in question has defined markings in an established coordinate system of the mask, the position of which (taking the aforementioned accuracy values into consideration) is consequently clearly established in the X/Y plane and therefore in the raster of the total image. Of course, it is also possible, at this point, to work with a three-dimensional mask, which furthermore has markings not only in the X plane and the Y plane, but also in the Z direction.

Usually, however, a mask having defined markings in the X/Y plane is used. The position of these markings relative to a reference line or a mask delimitation, respectively, and consequently relative to the coordinate system of the mask, has accordingly been established. When imaging the mask, the markings must be found at the defined positions in the individual image, and consequently also in the raster of the total image.

If the adjustment unit is now moved, correction values can be derived from deviations of the theoretical position from the actual position of the markings. For example, a first marking might have the position 50 μm; 50 μm for the X/Y values in comparison with a reference zero point (coordinate origin) of the mask. In order to now transport this marking into the image center of an individual image, for example, it may turn out that the adjustment unit merely has to be moved 49 μm in the X direction, while an adjustment of 45 μm is necessary in the Y direction. Resulting from this, an X/Y correction value for this raster point in the total image of (−1 μm; −5 μm) is obtained. This correction value is consequently stored in memory at the X/Y raster point (50 μm; 50 μm).

If a position X/Y (50 μm; 50 μm) in the coordinate system of the total image is consequently supposed to be approached, i.e. so that this position is in the image center of the individual image to be taken, the control system will activate the adjustment unit, taking the correction value into consideration. In other words, the adjustment unit will be moved not by 50 μm in the X direction, but rather by 50 μm−1 μm, and experiences an adjustment in the Y direction by 50 μm−5 μm, i.e. 45 μm.

Previously, however, the coordinate systems of the mask, on the one hand, and of the total image (and accordingly also of the individual images), on the other hand, must be brought into coverage. Usually, the coordinate system of the mask will also be used as the coordinate system for the total image.

In the same manner as described above, correction values for the total image can now be determined and stored in the memory of the control system. In this connection, the method of procedure will generally be such that a central correction value per individual image is recorded. In other words, it is recommended to approach the image centers of the individual images to be individually taken, in each instance, in the coordinate system of the total image (which generally corresponds to that of the mask), and to then record related correction values using the mask, and store them in the memory of the control system.

This means that if the total image is composed of 100 individual images, for example, in most cases 100 correction values must be recorded and stored in memory within the framework of the calibration described, in the center of the individual images, in each instance. Using these correction values, the adjustment unit can then be corrected in its related position in connection with approaching the correct position and taking the individual image, in each instance.

In this connection, it is understood that the correction values are generally filed in a one-dimensional or multi-dimensional correction matrix. In the example case of 100 individual images, one would proceed from a 10×10 matrix, if the total image has a square structure. Each individual correction value of this correction matrix now in turn has the corresponding individual correction values for the correction in the X direction, the Y direction and, if applicable, the Z direction.

There is the possibility of recording the correction values only once, using the mask or sample mask, at a speed of the adjustment unit or of the related drive device, respectively, that is set at a fixed value. Just as well, however, several correction values can be recorded as a function of the speed and/or the direction of the drive device for the adjustment unit as described, and one or more speed-dependent and/or direction-dependent correction matrices can be recorded. This means that in this case, a 10×10 correction matrix would be determined, for example, and stored in memory, which corresponds to an adjustment speed of the drive device, or of the generally related spindle drives, respectively, of perhaps 10 mm/sec. Furthermore, a second correction matrix could be recorded and stored in memory, in the same manner, which belongs to twice the adjustment speed of 20 mm/sec. Likewise, different correction matrices can be defined, specifically depending, for example, on whether the spindle drive mechanism for the X direction is approaching increasing X values or decreasing X values. The same holds true for the spindle drive mechanism in the Y direction as well as in the Z direction, if applicable. In this way, a plurality of correction matrices is obtained, specifically as a function of the speed and/or the direction of the drive device for the adjustment unit, in each instance.

In the introduction, it was already pointed out that the scanning device can be equipped with several imaging and/or recording units. This recording unit, or a related sensor or surface sensor, respectively, can be a CCD (charge-coupled device) chip, but this is not a restriction. It is known that this semiconductor component consists of many cells or pixels arranged in the manner of a chessboard. In this connection, the chip in question is at the location where the film plane is otherwise disposed in the case of a photographic recording of the sample. Electrons collect in the cells of the CCD chip, under the effect of light from a light source disposed below the sample or below the sample table, respectively, whereby the number of electrons is a measure for the duration and the intensity of the incident light. The cells or pixels can be read out, and the number of electrons is counted, in each instance. In this way, a certain brightness value can be assigned to each individual pixel. In connection with the known coordinates of the pixels, the desired digitalized image can be calculated and composed in the control system.

Within the framework of the invention, there is now the option of maintaining the recording unit, i.e. the CCD chip, to be stationary, and of changing the magnification and consequently the sample cutout, in that a different imaging unit is used. For this purpose, the scanning device has at least one microscope lens or several microscope lenses, which are accommodated in a lens nosepiece. By means of rotating the lens nosepiece, the desired microscope lens and therefore the selected imaging unit can be used. This is done either manually or controlled by the control system.

Now it is possible that the change from one microscope lens to another changes the position of the image of the sample relative to the recording unit or the CCD chip slightly. In order to determine this change, again correction values can be recorded, specifically for each imaging unit or each microscope lens separately. In addition to the speed-dependent and/or direction-dependent correction matrices, if applicable, those that correspond to a certain imaging unit or a predetermined microscope lens, respectively, are also supplementally recorded.

In detail, a deviation of imaging unit or microscope lens, respectively, to the imaging unit can be determined and balanced out in that again, the image center of the individual image to be taken or that has been taken is identified with a certain X/Y value (which might already have undergone a correction by means of correction values of the adjustment unit for the sample table, but this is not absolutely necessary). If the position of the image center now changes when switching to a different imaging unit or a different microscope lens, the deviation of the "new" image center as compared with the old or original image center can be determined using the mask, and leads to a related correction value for the "new" imaging unit in comparison with the original imaging unit. In the example case with the X/Y coordinates (50 µm; 50 µm) in the image center, this might result in a correction value of (−3 µm; +2 µm). This means that in the case of a switch from the "old" to the "new" imaging unit, in reality the position (47 µm; 52 µm is approached, not (50 µm; 50 µm).

Finally, the correction values can also be determined as a function of additional parameters, such as the size and/or the weight of the sample table, the temperature at the set-up location, the number of recording cycles, etc., for example. In the first case mentioned, the invention takes into account the circumstance that different and interchangeable sample tables might be used, and accordingly, that a correction must be made in accordance with the sample table selected and its weight. Furthermore, the temperature at the set-up location might have an effect on the correction values, and this can be taken into consideration using an additional temperature sensor. Finally, the number of recording cycles, i.e. in the final analysis, the "age" of the device and also its frequency of use, also plays a role, if the matter of concern is to balance out mechanical play.

The bottom line is that a whole bundle of correction matrices is stored in the memory of the control device, specifically one for each possible speed of the drive device for the setting unit, in each instance, one for each possible direction of the drive device in question, in each instance, one correction matrix for each imaging unit or each microscope lens, respectively, in each instance, one for each selected sample table, in each instance, etc.

If now the speed for the drive device of the adjustment device and its direction have been preselected using the control system, and the sample table has been input, and the desired imaging unit or the selected microscope lens, respectively, has been established, the control system can select the correction matrices that belong to these predetermined parameters. The total correction matrix is now derived from these individual correction matrices. This is done, in the simplest case, in that the correction values are added, in each instance.

For example, in the above case, with the correction value (−1 µm; −5 µm), it can be expected, in the case of a change to a different microscope lens, that supplemental correction values (−3 µm; +2 µm) will result at the location (50 µm; 50 µm) in question. From this, a total correction value of (−1 µm; +(−3 µm); −5 µm+2 µm) is then obtained, corresponding to (−4 µm; −3 µm). This total correction value is not taken into consideration by the control system if the adjustment unit is supposed to approach the desired position (50 µm; 50 µm), taking the "new" imaging unit into consideration. This is because in reality, the adjustment unit is now moved "only" to the point (46 µm; 47 µm).

As a spindle drive mechanism for the drive device of the adjustment unit, the invention regularly suggests the use of ball rotation spindle drive mechanisms. These are particularly suitable for long displacement paths and are characterized by great rigidity, which is also promoted by installation with bias.

In the end result, a device for optically scanning a sample as well as a related work method are made available, which can be used to balance out mechanical play during sample scanning. This is done in that before the actual sample scanning takes place, correction values are recorded and stored in the memory of the control system, and taken into consideration during the setting procedure. Fundamentally, however, the correction equalization can also take place during the actual sample scanning. This can be implemented, for example, in that the mask or reference mask or sample mask, respectively, is also transilluminated, supplemental to the sample. In the simplest case, this is done in that the sample is attached to one side of a lens carrier, for example, while the opposite side carries the sample mask or reference mask. In this way, the desired correction can be performed at the same time, during the sample scanning procedure.

One way or the other, the invention makes a precision that was unknown until now possible when taking the individual images, which can consequently be combined to form the total image, without any problems. This can be done with abutment or with overlap. These are the significant advantages.

Figure 2:
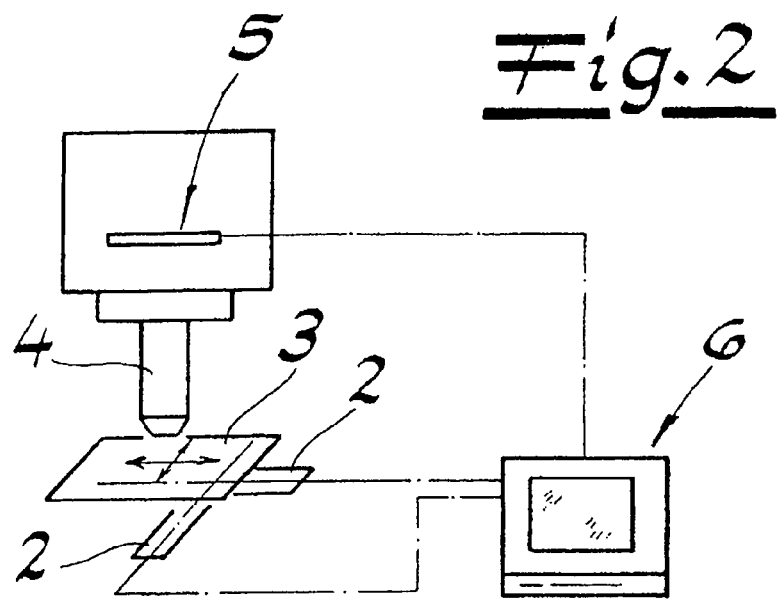
Figure 5:
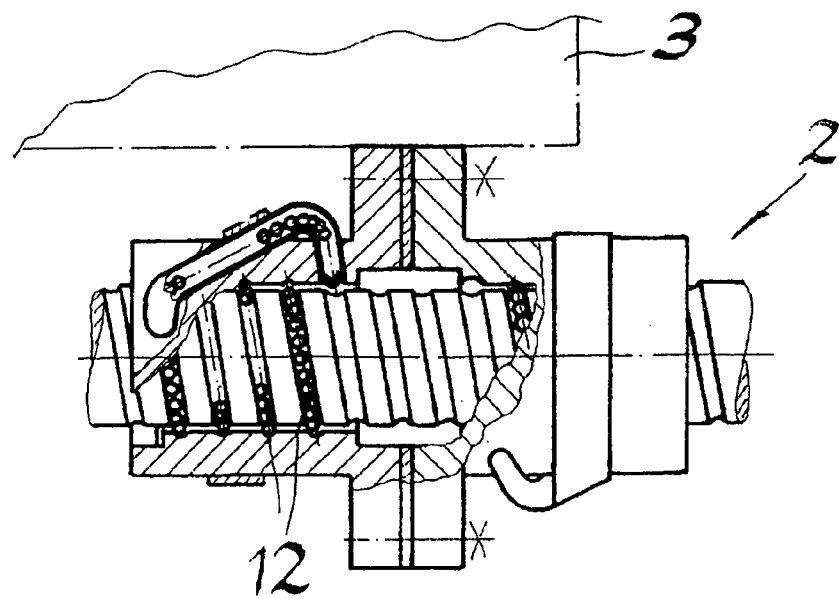

In the following, the invention will be explained in greater detail using a drawing that shows an embodiment merely as an example; this shows:

FIG. 1 the device according to the invention in a perspective view;

FIG. 2 the object according to FIG. 1 schematically,

FIG. 3 the device according to the invention, reduced to the scanning device and the adjustment unit, FIG. 4 the correction procedure schematically, and FIG. 5 details of the adjustment unit and of the related drive device, respectively.

In the figures, a device for optically scanning a sample 1 is shown. This sample 1 is a section through a biological tissue or a material, but this is not a restriction. In this connection, the section is produced in such a manner that the sample 1 can be transilluminated by a white-light source W and its image can be taken. For this purpose, the device has an adjustment unit 2, 3 as well as a scanning device 4, 5 as part of its basic structure.

In detail, the adjustment unit 2, 3, within the scope of the exemplary embodiment, is composed of two spindle drive mechanisms 2 as the drive device 2, as well as a sample table 3. The white-light source W is disposed underneath the sample table 3, so that the image of the sample 1 can be recorded by the scanning device 4, 5 disposed above that. The scanning device 4, 5 comprises several imaging units or microscope lenses 4 and a recording unit or a surface sensor, or a CCD chip 5, respectively. The sample 1 is moved relative to the scanning unit 4, 5 by means of the adjustment unit 2, 3. For this purpose, the adjustment unit 2, 3 is activated by the control system 6. Within the scope of the example shown, the sample table 3 is merely moved in the X direction and Y direction, although the adjustment unit 2, 3 could fundamentally also be additionally adjusted in the height direction or Z direction, but this is not shown.

According to the invention, correction values K are now recorded for mechanical play equalization of the adjustment unit 2, 3, and stored in the memory of the control system 6, and taken into consideration during the setting procedure. Using the setting procedure, the sample 1 is scanned, taking into consideration a total of twelve individual images in the example case (cf. FIG. 4). Of the twelve individual images, only one individual image B1 is shown, for the sake of clarity. In any case, the twelve individual images are combined into a total image, in the sense of a raster, in the control system 6. In order to do this without problems, i.e. to balance out any deviations of the positions of the individual images in the total image, relative to one another, due to mechanical play within the device shown, the correction values K are recorded, as described.

This is done in that a mask or reference mask 7, respectively, indicated in FIG. 4, is scanned in place of or at the same time with the sample 1. In the example case, the sample 1 has been applied to the top of an object carrier 8, as the magnified illustration in FIG. 3 makes clear. The underside of the object carrier 8, in contrast, carries the mask 7. This mask or reference mask 7 is a lithography mask, as known from the production of semiconductors, but this is not a restriction. Such a mask 7 has one or more markings 9 (cf. FIG. 4).

In the example case, one marking 9 is provided centrally, in each instance, i.e. in the image center, relative to the individual image to be taken, in each instance. Of course, several markings 9 can also be disposed, also at a different location, and the number of markings 9 can experience a variation. One way or the other, the marking 9 has a defined position in the example case (X=50 µm; Y=50 µm) relative to a reference point 10, which forms the origin of the X/Y coordinate system. This means that every position of the marking 9, in each instance, relative to this reference point or origin 10, is established by means of defined X/Y coordinates. Within the framework of the exemplary embodiment, the origin 10 and consequently the coordinate system of the mask or reference mask 7, respectively, coincides with that of the total image, which consists of the twelve individual images.

In FIG. 4, the correction procedure is now explained schematically. The "true" position of the mask 7 relative to its coordinate system with the origin 10 is shown with solid lines. In contrast, the measured, actual image of the reference mask 7 corresponds to the representation with a dot-dash line. In this connection, the related image points of the markings 9 are indicated with a ', just like the reference mask 7. The fact that the image of the reference mask 7—characterized with the reference symbol 7'—is recorded by a CCD chip 5, is also explained by the dot-dash arrow at this location. In order not to make the illustration more complicated than necessary, it is assumed, in the example case of FIG. 4, that all twelve individual images, i.e. the twelve individual markings 9 of the reference mask 7, require only a single correction value K. In other words, FIG. 4 assumes that each of the twelve individual images experiences a deviation that remains the same, when recording the reference mask 7, which deviation can be balanced out with only a single correction value K.

The image of the mask or of the reference mask 7, respectively—characterized by the reference symbol 7'—is now recorded by the device shown, in that the related individual images, in each instance, are combined to form the total image, in accordance with the top representation in FIG. 4, in the control system 6, i.e. the position of the imaged mask 7' is evaluated relative to the CCD chip 5, using the control system 6. In other words, the mask 7 is imaged using the imaging unit or the microscope lens 4, respectively, on the sensor or surface sensor 5, respectively, and here it produces the image of the mask 7'. In this procedure, each individual image of the sensor plane corresponds, in terms of its size, essentially to the dimensions of the CCD chip 5 implemented at this location.

Each individual image is now read out of the CCD chip 5 by the control system 6, and stored in the memory of the control system 6, and placed in its place in the raster of the total image. In order to now balance out mechanical inaccuracies, the location of the individual imaged markings 9' is put into relation with the actual position of the marking 9, in each instance, relative to the reference point or origin 10, respectively. This is expressed by FIG. 4. It can be seen that mechanical inaccuracies lead to the result that the marking 9' that is imaged, in each instance (shown with a dot-dash line in the upper part of FIG. 4), possesses a slightly different position than the marking 9 (shown with a solid line) in the original image.

This deviation can be determined and quantified as a correction value K. This is because the CCD chip 5 has the pixels disposed in chessboard-like manner, as already discussed, with a known and established position in the X plane and Y plane, i.e. in its sensor plane. Taking into consideration the magnification predetermined by the imaging unit or the microscope lens 4, respectively, a conclusion can now be drawn concerning the deviation of the imaged marking 9', in each instance, from the original marking 9 in the mask 7. In this connection, each deviation results in an X/Y correction value K, as already indicated in the introduction.

In the example case, only a single correction value K is shown in FIG. 4. In reality, however, a separate correction value $K_1, K_2, \ldots K_{12}$ will be recorded and determined for each individual image B1, B2, ... B12. But this was not shown, for reasons of clarity. In any case, the imaged marking 9' deviates from the related original "true" marking 9 by −1 µm in the X direction, in the example case, while the Y direction has a deviation of −5 µm, as shown by the related arrows (greatly and only schematically magnified) indicated with K, in each instance. In this connection, the position of the true marking 9 is predetermined by its affixation to the sample table 3 and the establishment of the coordinate system for the mask 7, and consequently for the total image, which is undertaken in this manner.

Taking these premises into consideration, a related correction value K with corresponding X/Y values can be determined for every original marking 9, and stored in the memory of the control system 6. In fact, a separate correction value $K_1, K_2, \ldots K_{12}$ will be defined and recorded in the control system 6 for each individual image B1, B2, ... B12. In this way, each individual image B1, B2, ... B12 will be flanked with a specific correction value $K_1, K_2, \ldots K_{12}$.—Of course, theoretically it is also possible to work with several correction values K per individual image. As a rule, however, one uses a single correction value K per individual image. Using this correction value K, the position of the sample table 3 is corrected, before the sample 1 is recorded using the CCD chip 5. The original position of the sample 1 before the correction, as well as the related position of the sample table 3, is shown in FIG. 4, bottom, with a broken line, while the position of the sample table 3 and therefore the sample 1 after correction has undergone a characterization with a solid line in FIG. 4, bottom.

One can see that in connection with recording the related individual image, the corresponding correction value K has the result that the sample table 3 undergoes a corresponding adjustment, i.e. moves to the position (49 μm; 45 μm) instead of the reference position shown with a broken line (50 μm; 50 μm in the example). As a result, the sample 1 also undergoes a corresponding displacement, which compensates the mechanical inaccuracies that were previously determined, so that the image of the sample 1 comes to lie in the correct position on the sensor 5, during the subsequent recording of the image.

If work is carried out with more than one marking 9 in the example case, of course, it is possible to interpolate or extrapolate between the individual markings 9, in order to establish the desired correction value K for the individual image. This means that a certain correction value in the X direction and the Y direction is determined for the center of each individual image.

This leads to the result that when taking the image of the sample 1, for example, the individual image B1 in FIG. 4, top, must be corrected with the indicated correction value (−1 μm; −5 μm), in the X direction and the Y direction, respectively. The control system 6 does this, in that the adjustment unit 2, 3 is moved only 49 μm in the X direction and undergoes an adjustment by 45 μm in the Y direction, in order to subsequently be able to store the individual image in the memory of the control system 6 with the correct position of the center (50 μm; 50 μm). This process is repeated for each individual image, so that subsequently, the individual images are correctly joined together to form the total image, in the raster. This, of course, presupposes that first of all, it is ensured that the origin or zero point 10, in each instance, of the sample 1, on the one hand, and of the total image in the control system 6, and likewise of the mask 7 and its image 7', are brought into coverage.

The correction values K as described can be determined as a function of the speed and/or direction of the drive device 2 for the adjustment unit 2, 3. One or more speed-dependent and/or direction-dependent correction matrices result from this, as was already described in the introduction. Likewise, several imaging units 4 as well as different sample tables 3 can optionally be used. For this purpose, the scanning device 4, 5 has several microscope lenses 4, which are accommodated in a lens nosepiece 11 activated by the control system 6. In this manner, the control system 6 receives direct feedback about the microscope lens 4 that is in use at any particular time, and consequently can refer back to the related correction matrix, if necessary.

The adjustment unit 2, 3, i.e. the related drive device 2, has two spindle drive mechanisms 2 which are configured as ball rotation spindle drive mechanisms 2. The spindle drive mechanisms 2 are disposed orthogonal to one another, in each instance, and ensure adjustment of the sample table 3 and therefore the sample 1 in the X direction and the Y direction, respectively. Details of the ball rotation spindle drive mechanism 2, in each instance, are shown in FIG. 5. It can be seen that individual balls 12 are guided in rotation.

The control system 6 as a whole ensures that the adjustment unit 2, 3 and with it the sample 1 assumes the desired position for recording the individual image during image recording.

Subsequent to this, the individual image is recorded by the CCD chip 5, and stored in the memory of the control unit 6, in its position, in the raster of the total image. By means of the prior or simultaneous procedure of the equalization of mechanical play and recording of the correction values K, the control system 6 now "knows" that a certain correction value K (X; Y) corresponds to the related and recorded individual image.—In this way, mechanical play equalization can be implemented, in total, which functions electronically, in the final analysis, so that even inexpensive adjustment units 2, 3 can easily be used.

The invention claimed is:

1. Device for optically scanning a sample (1), having at least one adjustment unit (2, 3), having a drive device (2) as well as a sample table (3), and having at least one scanning device (4, 5),
   whereby a white-light source (W) is disposed underneath the sample table (3) and transilluminates the sample (1), so that the image of the sample (1) is recorded by the scanning device (4, 5) disposed above it,
   whereby furthermore the sample (1) is moved relative to the scanning device (4, 5), by means of the adjustment unit (2, 3) activated by a control system (6), or vice versa, and
   whereby individual images of the sample (1) are taken, using the scanning device (4, 5), and subsequent to this, combined to form a total image, in the control system (6),
   wherein
correction values (K) are recorded and stored in the memory of the control system (6), and taken into consideration during the setting procedure, for equalization of mechanical insufficiencies of the adjustment unit (2, 3) and/or the scanning device (4, 5), using a mask (7) scanned in place of or in addition to the sample (1), having defined markings (9).

2. Device according to claim 1, wherein the mask (7) is configured as a lithography mask.

3. Device according to claim 2, wherein the correction values (K) are stored in a one-dimensional or multi-dimensional correction matrix, whereby intermediate values are defined by means of extrapolation.

4. Device according to claim 1, wherein the correction values (K) are recorded as a function of the speed and/or the direction of the drive device (2) of the adjustment unit (2, 3), or one or more speed-dependent and/or direction-dependent correction matrices are recorded.

5. Device according to claim 1, wherein the scanning device (4, 5) is equipped with several imaging units (4) and/or recording units (5).

6. Device according to claim 1, wherein depending on the selection of the imaging unit (4) and/or recording unit (5), related correction values (K) are determined and stored in the memory of the control system (6).

7. Device according to claim 1, wherein additionally, the correction values (K) are also determined as a function of additional parameters, such as size and/or weight of a sample table (3), for example, temperature at the set-up location, number of recording cycles, etc., and that these are taken into consideration.

8. Device according to claim 1, wherein the adjustment unit (2, 3) is configured as an X/Y adjustment unit (2, 3), and has at least two spindle drive mechanisms (2) as the drive device (2), in each instance.

9. Device according to claim 1, wherein the scanning device (4, 5) has at least one microscope lens (4) as the imaging unit (4) and one sensor, e.g. surface sensor (5), as the recording unit (5) for image recording.

10. Method for optically scanning a sample (1), having at least one adjustment unit (2, 3) having a drive device (2) as well as a sample table (3), and having at least one scanning device (4, 5), whereby a white-light source (W) is disposed underneath the sample table (3) and transilluminates the sample (1), so that the image of the sample (1) is recorded by the scanning device (4, 5) disposed above it, after which the sample (1) is moved relative to the scanning device (4, 5) by means of the adjustment unit (2, 3) activated by a control system (6), or vice versa, and after which individual images of the sample (1) are taken, using the scanning device (4, 5), and subsequent to this, combined to form a total image, in the control system (6), wherein correction values (K) are recorded and stored in the memory of the control system (6), and taken into consideration during the setting procedure, for equalization of mechanical insufficiencies of the adjustment unit (2, 3) and/or the scanning device (4, 5), using a mask (7) scanned in place of or in addition to the sample (1), having defined markings (9).

* * * * *